Jan. 15, 1935.  L. L. FOSS  1,988,197
DEEP WELL WATER SUCTION POWER SYSTEM WITH MOTORS
Filed Dec. 29, 1933
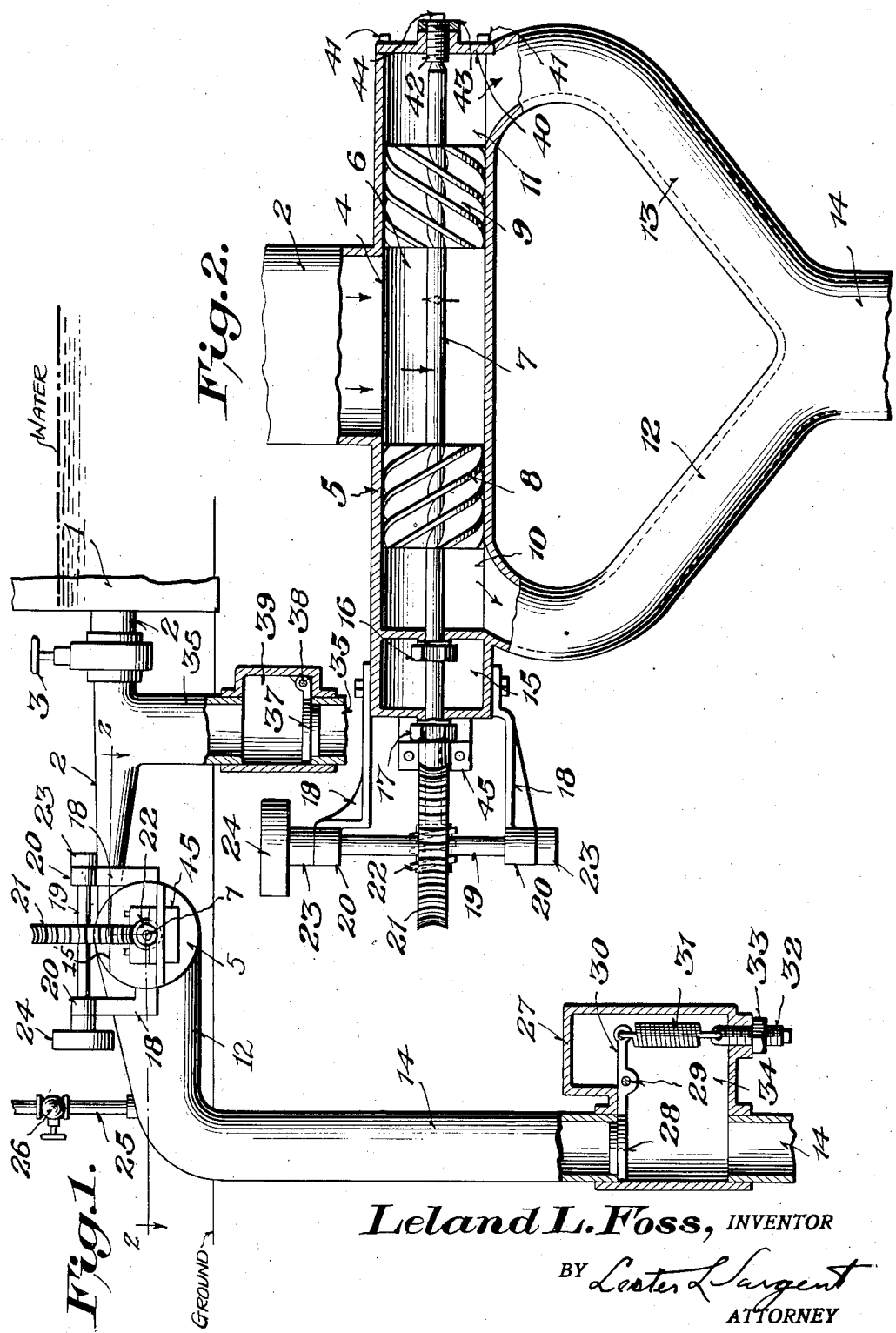
Leland L. Foss, INVENTOR
BY Lester L. Sargent
ATTORNEY Patented Jan. 15, 1935

1,988,197

UNITED STATES PATENT OFFICE 1,988,197

DEEP WELL WATER SUCTION POWER SYSTEM WITH MOTORS

Leland L. Foss, Pulaski, Ga.

Application December 29, 1933, Serial No. 704,546

12 Claims. (Cl. 61—19)

The object of my invention is to provide a suction power mill race whereby water motors of any desired type may be operated by suction of water flowing into a deep well from a well of higher level or from any surface source of water such as a lake, pond, river, branch, or creek, or the like; to utilize such an apparatus in combination with my double water worm motor; and to provide novel and convenient means for controlling the operation of the apparatus. It is an especial object of my invention to provide means and aparatus whereby wells may be substituted for the building of dams as a means for obtaining and supplying water power. I attain these and other objects of my invention by the mechanism illustrated in the accompanying drawing, in which—

Figure 1 is a side elevation of my apparatus, parts being broken away and shown in vertical section to show interior construction of valve chambers; and Fig. 2 is a top plan view of a portion of the apparatus, the water motor casing and a portion of connected conduits thereto being shown in section.

Like numerals designate like parts in each of the several views.

Referring to the accompanying drawing, 1 represents any suitable source of water supply which may be a water tank, a pond, river, lake or creek or the like, or a flowing artesian well or any source of water supply close to the surface of the earth.

Member 2 is a priming and water supply conduit opening out of the priming tank 1 and is provided with a suitable shut-off valve or gate 3 which is manually operated. Conduit 2 is flattened and broadened at its mouth 4 and opens tangentially into the cylindrical casing 5, as shown in Figs. 1 and 2, delivering the water tangentially into the whirlpool chamber 6. I provide a shaft 7 extending longitudinally of the casing 5 and on this common shaft I provide suitable spaced and balanced rotors 8 and 9 each having the series of worms or threads shown extending approximately one-half way round the hub or shaft with a possible variation of from one-third to two-thirds the distance around the hub. The rotor 8 has right hand threads turning in a left hand direction and the rotor 9 has left hand threads and turning in a right hand direction. I provide suction chambers 10 and 11 into which the water is siphoned from the rotors 8 and 9 respectively. I provide a conduit 12 opening out of the suction chamber 11. These conduits merge in a larger main downwardly extending conduit 14.

I provide a sealing chamber 15 which is full of water and is provided for the purpose of preventing leakage of air into the suction chamber 10. I provide a suitable packing gland 16 on shaft 7 in chamber 15, and another suitable packing gland 17 on shaft 7 adjacent the end of casing 5 on shaft 7 to increase the efficiency of the apparatus. Chamber 15 is open at the top to afford access to the gland 16, the top edge of the chamber being indicated by numeral 15' in Fig. 1.

I provide suitable opposite frame members 18 affixed to or integral with casing 5 and carrying the journals 20 in which shaft 19 is mounted. I provide any suitable plurality or series of worm gears, which preferably consist of a large worm gear 21 mounted on shaft 19 and a small worm gear 22 which is mounted on shaft 7 and meshes with gear 21, as shown in the drawing. I provide suitable collars 23 on shaft 19. I also provide a driven pulley 24 on said shaft which functions as a driving pulley for operating any other desired machinery.

Referring to Fig. 1, I provide an air escape pipe 25 opening out of the upper end of conduit 14 preferably at a point slightly beyond the junction of conduits 12 and 13. Air escape pipe 25 is provided with a suitable manually operated valve 26.

At a point in conduit 14 at a substantial distance below the point of junction of conduits 12 and 13, I provide a suitable but preferably automatic valve 28 in chamber 34 and which is mounted on pivot 29 in the valve casing or frame 27. Valve 28 has an arm 30 to which one end of a suitable spring 31 is attached, the other end of spring 31 being attached to a suitable adjustable screw-threaded anchoring bolt or screw on the end of which is a suitable jamb nut 33. It will be observed that the casing 27 is of suitable size to provide an ample chamber 34 for the movement of valve 28 to an open position.

As shown in Fig. 1, I provide a water supply conduit 35 opening into the conduit 2 and which may be connected with any suitable source of water supply below the surface of the ground such as an artesian or flowing well, or pond, lake, or river, or creek. I provide a suitable valve casing 39 in conduit 35 and a suitable valve 37 mounted on pivot 38 and which seats by the action of gravity and which is an essential element.

I provide a suitable removable plate 40 on the end of cylindrical casing 5 secured by suitable means such as bolts 41. I provide an adjustable bearing 42 having a squared end 44. Bearing 42 is secured in place by a jamb nut 43. Member 42 is a bearing for the conical end of the shaft 7 as shown in Fig. 2.

The method of using or operating the apparatus is as follows:

Water-supply conduit 35 is placed in communication with any desired source of water supply such as a pond, river or lake or a deep-flowing artesian well. A second well is bored deep down to a sub-strata of the earth where there is a flowing stream of low pressure to produce a suction or siphoning action of water through conduit 14. When the apparatus is suitably installed the valve 3 is manually opened to admit water into the conduit 2 from a suitable priming tank 1.

As a part of the priming or starting system, conduit 35 is provided with a gravity-controlled valve near its upper end and which preferably is positioned just under the water level in the water supply source. Only a small amount of the water can flow down into conduit 35 to valve 37. It then must pass through the rest of conduit 2 into the whirlpool chamber 7, and thence through the rotors 8 and 9, and thence through the respective suction chambers 10 and 11, and thence the respective conduits 12 and 13 which are in communication with those chambers, and from conduits 12 and 13 into the main suction conduit 14 downward to the point of discharge in a deep suction well.

The valve 28 it will be noted is positioned at a point in suction conduit 14 below the plane in which valve 37 in water supply conduit 35 is located. Valve 28 is attached to a relatively light spring 31 so that the weight of the water in the upper end of conduit 14 before priming will be supported by the valve 28 but when the pressure of water from the priming tank 1 is added by opening valve 3, it will overbalance the resistance of spring 31 on valve 28 and open the valve and start a flow of water down through suction conduit 14, whereby a suction or siphoning action is induced through the apparatus and water from any higher level (or approximately surface level as the case may be) with which conduit 35 may be in communication is continuously siphoned or sucked through conduit 2, motor whirlpool chamber 5, rotors 8 and 9, suction conduits or water conveyors 12 and 13, and main suction conduit 14 in the manner illustrated in the drawing.

The water in tank or water supply source 1 is utilized for the purpose of initially filling the conduits 2, 12, 13 and 14 to enable the starting of the siphoning action. After the siphoning action is started the valve 3 may be closed and the water will continuously drawn through the water supply conduit 35, unless and until the valve 26 is opened which will stop operation of the system.

The air pipe 25 and valve 26 is used as a control valve for starting or stopping the operation of the system when the water supply is obtained from an artesian well through conduit 35, or any other source of water supply which is lower than the motor, under which conditions the priming tank 1 is required for the operation of the system.

If the well is an artesian well which delivers water above the surface of the ground the tank 1 would not be used and the position of the valve 3 would be disposed between the conduit 35 and the cylindrical casing 5, or if any other water from rivers, ponds or lakes should be high enough to do its own priming, this same valve 3 would then be used to start or stop the motor. In other words, the level of the surface of the water of said source of supply would be in a plane with or above the top of conduit 2. After I siphon the water from a river, lake or any water that does not come to the surface, that I may use for power, then I use the tank for a priming system, but when water is above the level of the motor I do not need this tank, I only need the valve 3 which when closed stops the motor and which is opened to start the motor.

Where the water has to be siphoned or sucked from a deep well by a priming system then the tank is needed; otherwise it is not needed.

When the work is through, in order to stop the motor I open the air valve 26 in air pipe 25 and air rushes in and the water in both conduits 14 and 35 flows back to the level of the respective wells to which they extend.

It will be understood that a well may be the source of water supply, it being only required that the suction conduit be extended to a depth substantially greater than the depth of the water supply source. It also will be understood that the effective action of suction on the motor is the equivalent to the pressure of the down-flowing stream of like or corresponding length.

I may use any suitable governing mechanism, and any suitable oiling mechanism in connection with the apparatus.

What I claim is:

1. In apparatus of the type described, the combination of a priming tank, a water motor, a conduit extending from the priming tank to the water motor, a shut-off valve for said conduit, a water supply conduit extending from a relatively low source of water supply to and in communication with the aforesaid valve controlled conduit at a point between the priming tank and the water motor, a gravity operated valve in said water supply conduit to close the conduit for water priming purposes, a suction conduit extending from the water motor for siphoning water through and from the water motor, said conduit being extended to and siphoning into a deep suction well, and a valve in said suction conduit.

2. In apparatus of the type described, the combination of a priming tank, a water motor, a conduit extending from the priming tank to the water motor, a shut-off valve for said conduit, a water supply conduit extending from a source of water supply to and in communication with the aforesaid valve controlled conduit at a point between the priming tank and the water motor, a valve in said water supply conduit to close the conduit for water priming purposes, a suction conduit extending from the water motor for siphoning water through and from the water motor, said conduit including a vertically disposed section being extended to and siphoning into a deep suction well, a valve disposed horizontally in said vertically disposed section of the suction conduit, a spring operatively connected with said valve and normally reseating the valve when there is no water pressure but of insufficient strength to prevent the valve from opening under the weight of water when the system is set in operation.

3. In a deep well water-suction power system, the combination of a water motor, a casing in which said motor is mounted, a suction chamber in said casing into which the water is sucked from and through the motor, a suction conduit extending from said chamber to a deep suction well, a spring-controlled valve in the path of the suction conduit, said valve being arranged to be opened automatically by the weight of the water flowing through the suction conduit and to be closed at other times, an air escape valve in the upper end of the suction conduit, a water supply conduit for conveying water to the water motor from a source of water supply at a higher level than the water in the deep suction well into which the water is sucked from the suction conduit, and a gravity-operated valve in said water-supply conduit.

4. In a deep well water-suction power system, the combination of a water motor; a casing in which said motor is mounted, a suction chamber in said casing into which the water is sucked from the motor; a suction conduit in communication with said chamber and extending to a deep suction well; a spring-controlled automatic valve in said conduit, said valve being adapted to open under the weight of water when the apparatus is in operation, an air escape valve in the upper end of said conduit; a supply conduit for supplying water to the water motor; a priming tank in communication with said conduit, a shut-off valve in said conduit; a downwardly extending water supply conduit in communication with a suitable water supply such as a lake, river, artesian well or the like; and a gravity-operated valve in the water supply conduit.

5. In combination with the apparatus defined in claim 4, said gravity-operated valve being positioned in the water supply conduit at a plane below the level of the surface of the water of the water supply whereby to prevent escape of air past the said valve.

6. In a deep well water-suction power system, the combination of a water motor comprising a cylindrical casing, spaced and balanced rotors in said casing, a common shaft mounted in and extending through one end of said casing and on which said rotors are mounted, said rotors being reversely threaded to drive the shaft in the same direction, a whirlpool chamber disposed between the rotors, suction chambers to which water is sucked from and through the rotors, suction conduits opening out of said suction chambers, a main suction conduit in which said suction conduits merge, said main suction conduit extending downwardly into a deep suction well to siphon water through the water motor, an automatic valve in said conduit arranged to be held in open position by the flow of water through the conduit, a spring for reseating the valve when the apparatus is not in operation, a water supply conduit connecting the water motor with a source of water supply, and a valve in said water supply conduit.

7. In combination with the apparatus defined in claim 6, a water-filled sealing chamber disposed at the end of the cylindrical rotor casing through which the rotor shaft extends, and a gland in said sealing chamber, whereby to prevent air leakage into the adjacent suction chamber.

8. In combination with the apparatus defined in claim 6, a plurality of worm gears operatively connected with the rotor-driven common shaft, a second shaft actuated by the rotor driven shaft and carrying the driven gear of the aforesaid gears, and a pulley on said second shaft for driving other machinery.

9. In a deep well water-section power system, the combination of a water motor comprising a cylindrical casing, spaced and balanced rotors in said casing, a common shaft mounted in and extending longitudinally of said cylindrical casing and on which said rotors are mounted, said rotors being reversely threaded to drive the shaft in the same direction, a whirlpool chamber disposed between the rotors, suction chambers to which water is sucked from and through the rotors, suction conduits opening out of said suction chambers, a main suction conduit in which said suction conduits merge, said main suction conduit extending downwardly into a deep suction well to siphon water through the water motor, an automatic valve in said conduit arranged to be held in open position by the flow of water through the conduit, a spring for reseating the valve when the apparatus is not in operation, a water supply conduit connecting the water motor with a source of water supply, a gravity-operated valve in said water supply conduit, a priming tank, a conduit from the priming tank and water supply conduit to the water motor, and a shut-off valve in said conduit for shutting off or opening communication with the priming tank for starting the operation of the power system.

10. In a deep well water suction power system, the combination of a priming tank, a conduit leading from said tank, a manually operable shut-off valve in said conduit, a water supply conduit connecting with the first mentioned conduit and in communication with a source of water supply such as a lake, river, pond, artesian well or the like, a gravity-operated valve near the upper end of said water supply conduit, a water motor casing with which said conduit is in communication, said conduit having its mouth disposed tangentially of the motor casing, a whirlpool chamber in the motor casing, spaced balanced rotors on either side of the whirlpool chamber, suction chambers at the ends of the rotors, suction conduits communicating with said suction chambers, a larger common downwardly extending suction conduit into which said first mentioned suction conduits merge, an automatically reseatable valve in said main suction conduit adapted to be opened under the pressure of water and closed when there is no water pressure, and means in connection with said suction conduit for stopping and starting the flow of water therethrough.

11. In a deep well water suction power system, the combination of a priming tank, a conduit leading from said tank, a manually operable shut-off valve in said conduit, a water supply conduit connecting with the first mentioned conduit and in communication with a source of water supply such as a lake, river, pond, artesian well or the like, a gravity-operated valve near the upper end of said water supply conduit, below the surface of the water level of said water supply, a water motor casing with which said conduit is in communication, said conduit having its mouth disposed tangentially of the motor casing, a whirlpool chamber in the motor casing, spaced balanced worm rotors on either side of the whirlpool chamber, suction chambers at the ends of the rotors, suction conduits communicating with said suction chambers, a larger common downwardly extending suction conduit into which said first mentioned suction conduits merge, an automatically reseatable valve in said main suction conduit adapted to be opened under the pressure of water and closed when there is no water pressure, and means in connection with said suction conduit for stopping and starting the flow of water therethrough.

12. In a deep well water suction power system, a water supply conduit in communication with a source of water supply such as a lake, river, pond, artesian well or the like, a gravity-operated valve near the upper end of said water supply conduit, a water motor casing with which said conduit is in communication, said conduit having its mouth disposed tangentially of the motor casing, a whirlpool chamber in the motor casing, spaced balanced worm rotors on either side of the whirlpool chamber, suction chambers at the ends of the rotors, suction conduits communicating with said suction chambers, a larger common downwardly extending suction conduit into which said first mentioned suction conduits merge, an automatically reseatable valve in said main suction conduit adapted to be opened under the pressure of water and closed when there is no water pressure, and means in connection with said suction conduit for stopping and starting the flow of water therethrough.

LELAND L. FOSS.